Patented Jan. 14, 1947

2,414,208

UNITED STATES PATENT OFFICE 2,414,208

PREPARATION OF PHOTOGRAPHIC COMPOSITIONS AND ELEMENTS

Otis Willard Murray, Fords, N. J., assignor to E. I. du Pont de Nemours & Company, Wilmington, Del., a corporation of Delaware No Drawing. Application May 29, 1945, Serial No. 596,601

6 Claims. (Cl. 95—7)

This invention relates to the preparation of photographic compositions which comprise modified polyvinyl alcohols which are insoluble in cold water and soluble in hot water. More particularly it relates to the preparation of light-sensitive silver halide dispersions in modified polyvinyl alcohols which are insoluble in cold water but soluble in hot water. The invention also relates to photographic elements containing layers of such compositions.

An object of this invention is to provide a process for making improved photographic compositions from polyvinyl alcohols including 75 to 100% hydrolyzed polyvinyl esters. Another object is to provide silver halide emulsions in polyvinyl alcohol which will tolerate a vigorous water-washing treatment. Another object is to provide modified polyvinyl alcohol-silver halide emulsion layers which are readily susceptible to processing by means of aqueous developing, washing, fixing, bleaching baths and the like.

Vinyl alcohol polymers such as polyvinyl alcohol and partially hydrolyzed polyvinyl esters which contain sufficient vinyl alcohol units —CH$_2$—CHOH— to make them water-soluble or water-alcohol soluble have been proposed for use as the binding agent for silver halide emulsion layers. The prior art varieties have not, however, proven to be satisfactory because they are not sufficiently resistant to the effects of water or of elevated temperatures. Hardeners have been proposed but they have some disadvantages. Some have a desensitizing or fogging action, others are expensive, and others permanently insolubilize the polyvinyl alcohol so that it is difficult to coat and process.

It has been found that satisfactory silver halide emulsions which are cold water insoluble, hot water soluble can be made by heating an aqueous solution of a polyvinyl alcohol of medium or high viscosity which contains at least 75% of free hydroxyl groups per molecule containing 20 to 150% by weight of dimethylolurea based on the polyvinyl alcohol to a temperature of 60° C. to 100° C. until a sample of the treated polyvinyl alcohol precipitated in a water-miscible solvent or concentrated salt solution is insoluble in water at 20° C. but dissolves readily in water within the range of 40° to 80° C. A practical period, for example, is 10 to 24 hours. To the resulting solution is added with stirring an aqueous solution of a water-soluble inorganic halide. Next is added an aqueous solution of a water-soluble inorganic silver salt with stirring whereby a silver halide is precipitated in a fine state of subdivision in the modified polyvinyl alcohol. The resulting emulsion is precipitated by adding a water-miscible solvent, e. g., acetone or concentrated salt solution, e. g., Na$_2$SO$_4$, and washed for 10 to 30 minutes with water. The swollen washed emulsion is then dissolved in water at a temperature of 40° to 80° C. and the solution coated onto a support such as a transparent film base or a water-proofed paper and dried. The precipitation of the silver salts, washing, coating, etc., should be carried out under conditions free from actinic rays so that the radiation will not expose the silver salts.

Apparently the dimethylolurea reacts bifunctionally with the polyvinyl alcohol whereby two or more molecules of the latter cross-link through the residue of the dimethylolurea. This cross-linking modifies the water-solubility of the products so that when the reaction is carried out to the extent described above a cold water insoluble hot water soluble product is formed. It is possible to remove water-soluble salts from the product prior to coating which is very advantageous. After aging of a coated layer the surface has a hardness equal to that of gelatin or polyvinyl alcohol completely insolubilized by means of dimethylolurea.

Various types of color formers may be added to the emulsions from dilute aqueous alkali solutions. This is preferably done after the washing step has been concluded but may be done at any stage during the formation of the silver halide emulsion. When the color former contains reactive hydroxyl groups, etc., it is possible that some interaction with the vinyl alcohol polymer may take place.

By treating the vinyl alcohol polymers with dimethylolurea in the manner described above, it is possible to remove substantially all of the water-soluble salts without removing any significant amount of the vinyl alcohol polymer or silver halides in the washing step.

The invention will be further illustrated but is not intended to be limited by the following examples. The parts are by weight.

Example I

To a liter of a 10% by weight solution of 85% hydrolyzed polyvinyl acetate which had a viscosity of 20 centipoises in 4% aqueous solution at 20° C. in water was added 150 grams of dimethylolurea wetted with 250 ccs. of water. This mixture was heated to 80° C. and kept at this temperature for a 24 hour period. Samples were removed at three hour intervals for examination. Each sample was precipitated in acetone, washed in water for 1 hour at 68° F. and then dissolved in warm water. Samples taken up to 15 hours dissolved to a large extent in the wash water. Those taken at 16 hours and longer swelled considerably but did not dissolve in water at 68° F. Sixteen hour samples dissolved readily in hot water at 80° C. Sixteen hour samples were dissolved and diluted to 5% strength and coated on a support to give a cold water-insoluble, water-permeable layer.

*Example II*

The following solution of hydrolyzed polyvinyl acetate of the same type described in Example I was heated for 17 hours at 82° C.:

| | | |
|---|---|---|
| 85% hydrolyzed polyvinyl acetate | grams | 10 |
| Water | ccs | 200 |
| Dimethylolurea | grams | 10 |
| Water | ccs | 25 |

To the above solution was added in darkness:

| | | |
|---|---|---|
| $NH_4Br$ | grams | 4 |
| $H_2O$ | ccs | 100 |
| $AgNO_3$ | grams | 5 |
| $H_2O$ | ccs | 25 |

The resulting emulsion was precipitated in acetone, washed 20 minutes in running tap water, redissolved in water at a temperature of 60° to 70° C. and coated on a transparent nitrocellulose film support. Exposure and development in a conventional black and white developer yielded a photographic image similar in quality and appearance to a film coated with a gelatino-silver bromide emulsion layer.

*Example III*

The following solution of polyvinyl acetate of the same type described in Example I was heated 16 hours at 80° C.

| | | |
|---|---|---|
| 85% hydrolyzed polyvinyl acetate | grams | 100 |
| Water | ccs | 1000 |
| Dimethylolurea | grams | 100 |

To the above solution was added in darkness:

| | | |
|---|---|---|
| $NH_4Br$ | grams | 20 |
| Water | ccs | 250 |
| $AgNO_3$ | grams | 25 |
| Water | ccs | 100 |

The resulting emulsion was precipitated in acetone, washed in water 1 hour at 68° F. and redissolved in water at 60° to 70° C. To the preparation was then added:

| | | |
|---|---|---|
| Meta-nitro phenylmethylpyrazolone | grams | 5 |
| Water | ccs | 100 |
| Ethanol | ccs | 100 |
| 5% $Na_2CO_3$ | ccs | 20 |

The emulsion-color former preparation was then coated on a paper support, exposed and developed in the following developer to give a magenta image.

| | | |
|---|---|---|
| Diethylparaphenylene diamine HCl | grams | 2 |
| $Na_2CO_3$ | do | 20 |
| Water | liter | 1 |

The usual additions were made to improve coating uniformity, anchorage, hardness, etc.

*Example IV*

The following solution was heated at 90° C. for 14 hours:

| | | |
|---|---|---|
| Polyvinyl alcohol (100% hydrolzyed polyvinyl acetate, viscosity 24 centipoises in 4% aqueous solution at 20° C.) | grams | 30 |
| Water | ccs | 300 |
| Dimethylolurea | grams | 7 |
| Water | ccs | 25 |

To this was added 50 ccs. of a water solution containing 2 grams of the orthosulfobenzaldehyde polyvinyl acetal of salicylaldehyde. The preparation was precipitated in 4 liters of acetone, washed in tap water, dissolved and coated to give a transparent layer which yielded a blue-green dye image on contact color development with a bleached silver image after the manner described in United States Patent 2,328,034. Silver halides can be precipitated in the emulsion as described in Example I and the element exposed and developed as described in Example III.

The invention moreover is not limited to the specific light-sensitive material described in the above-detailed examples. On the contrary, various other simple and mixed silver halides may be used as the light-sensitive materials in like manner. Mixtures of silver bromides, chlorides, and/or iodides can be made by adding mixtures of soluble salts of these halides in like manner. Other useful soluble halides include potassium bromide, potassium iodide, sodium and potassium chlorides and iodides, etc. Other useful soluble silver salts include silver sulfamate, silver sulfate, silver citrate and silver acetate.

The emulsions, after formation, are preferably digested at a temperature from 40° to 80° C. for a period of from 30 minutes to 6 hours. During the digestion stage or prior thereto, various types of sensitizing agents, e. g., sulfur sensitizers such as allylthioureas, thiocyanates, sodium thiosulfate, allylthiocyanates, can be added. In addition, various types of optical sensitizing dyes which modify the spectral characteristics of the resulting emulsions can be added. Suitable sensitizing dyes are described in United States Patents 2,010,388, 2,079,376, 2,202,990, 2,202,991, 2,202,992, 2,278,461, 2,265,908, etc.

Various types of color formers or dye intermediates capable of forming quinoneimine or azomethine dyes on color-forming development can be incorporated in the emulsions. Thus, the phenols, naphthols, pyrazolones, acylacetamides, hydrindene, N-homophthalylamines, etc., particularly those of high molecular weight and which are immobile in gelatin emulsion layers, can be used. Suitable color formers are described in United States Patents 2,108,602, 2,166,181, 2,178,612, 2,179,228, 2,179,229, 2,179,239, 2,182,815, 2,184,303, 2,186,849, 2,200,942, 2,283,276, and 2,328,652.

The photographic elements of this invention have the advantage that they may be readily prepared from economical materials. A further advantage resides in the fact that the novel modified vinyl alcohol polymer layers are uniform in quality, not subject to bacterial decomposition and are quite stable to heat. They are tougher and less easily abraded than gelatin layers and unmodified polyvinyl alcohol layers. A primary advantage is that light-sensitive silver halide emulsion layers which are free from soluble salts and insoluble in normal processing solutions can readily be prepared.

As many widely different embodiments of this invention can be made without departing from the spirit and scope thereof, it is to be understood that the invention is not to be limited except as defined by the claims.

What I claim is:

1. The process which comprises heating a solution of polyvinyl alcohol having at least 75% of free hydroxyl groups per molecule which contains 20 to 150% by weight of dimethylolurea based on the polyvinyl alcohol at a temperature of 60 to 100° C. until it is insoluble in water at 20° C. but readily dissolves at 40 to 80° C., precipitating light-sensitive silver salts in an aqueous solution of the resulting modified polyvinyl alcohol and washing soluble salts from the resulting dispersion.

2. The process which comprises heating a solution of polyvinyl alcohol having at least 75% of free hydroxyl groups per molecule which contains 20 to 150% by weight of dimethylolurea based on the polyvinyl alcohol at a temperature of 60 to 100° C. until it is insoluble in water at 20° C. but readily dissolves at 40 to 80° C., precipitating light-sensitive silver salts in an aqueous solution of the resulting modified polyvinyl alcohol and washing soluble salts from the resulting dispersion, and coating the solution onto a support.

3. The process which comprises heating a solution of polyvinyl alcohol having 85 to 100% of free hydroxyl groups per molecule which contains 20 to 150% by weight of dimethylolurea based on the polyvinyl alcohol at a temperature of 60 to 100° C. until it is insoluble in water at 20° C. but readily dissolves at 40 to 80° C., precipitating light-sensitive silver salts in an aqueous solution of the resulting modified polyvinyl alcohol and washing soluble salts from the resulting dispersion.

4. The process which comprises heating a solution of polyvinyl alcohol having 85 to 100% of free hydroxyl groups per molecule which contains 20 to 150% by weight of dimethylolurea based on the polyvinyl alcohol at a temperature of 60 to 100° C. until it is insoluble in water at 20° C. but readily dissolves at 40 to 80° C., precipitating light-sensitive silver salts in an aqueous solution of the resulting modified polyvinl alcohol and washing soluble salts from the resulting dispersion and coating the solution onto a transparent film base.

5. In a photographic element a layer composed of the product of the process of claim 1.

6. A photographic element having at least one layer composed of the product of the process of claim 3.

OTIS WILLARD MURRAY.